United States Patent [19]

Stoltz

[11] 4,068,443

[45] Jan. 17, 1978

[54] SECTION PIECE FOR T-SECTION ASSEMBLY

[76] Inventor: Jean Stoltz, rue de l'Eglise, 77 Ury, France

[21] Appl. No.: 512,142

[22] Filed: Oct. 4, 1974

Related U.S. Application Data

[62] Division of Ser. No. 365,097, May 30, 1973, Pat. No. 3,920,345.

[30] Foreign Application Priority Data

June 1, 1972 France .................. 72.19650

[51] Int. Cl.² .................................... E04C 3/30
[52] U.S. Cl. ....................................... 52/726; 403/404
[58] Field of Search ............... 403/217, 170, 173, 174, 403/178, 181, 182, 187, 205, 295, 298, 346, 382, 403, 406; 52/726, 758 F, 758 R, 665, 677, 685

[56] References Cited

U.S. PATENT DOCUMENTS

| | | | |
|---|---|---|---|
| 1,272,809 | 7/1918 | Johnson | 403/217 UX |
| 1,385,643 | 6/1921 | Roberts | 52/738 |
| 1,662,728 | 3/1928 | Wait | 403/217 UX |
| 1,688,949 | 10/1928 | Wait | 403/217 UX |
| 3,342,457 | 9/1967 | Babrowski | 403/217 UX |
| 3,369,332 | 2/1968 | Harlan | 52/720 X |
| 3,390,495 | 7/1968 | Dalby | 52/283 X |

FOREIGN PATENT DOCUMENTS 2,550 of 1874 United Kingdom .................. 52/738

*Primary Examiner*—William H. Schultz
*Attorney, Agent, or Firm*—Lane, Aitken, Dunner & Ziems

[57] ABSTRACT

T-Section device involving a single assembly element permitting multiple mounting combinations. It includes T-section whose blades, on one of its faces, has several antiwarping retaining grooves corresponding to those of the assembly element on which said grooved blade is engaged, said blade being fastened to the assembly element by two dish screws with six hollow surfaces. Said assembly element can assemble as many as four section pieces simultaneously.

The invention can be used for making up miscellaneous shelves, furniture items, presentation elements, decorations, etc.

3 Claims, 11 Drawing Figures

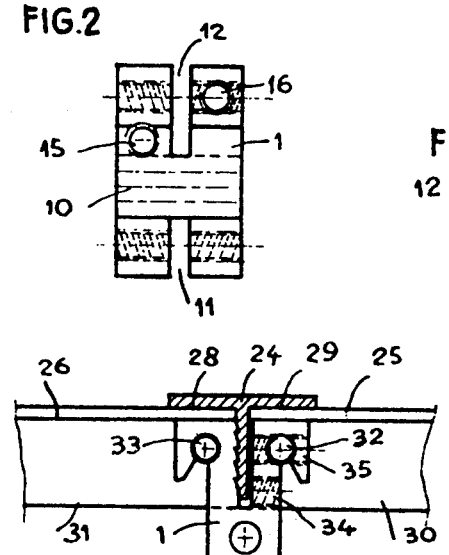
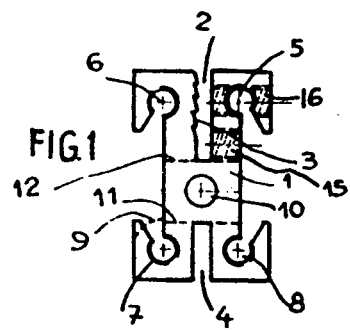
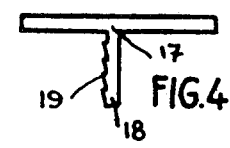
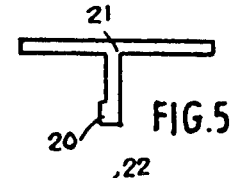
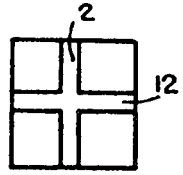
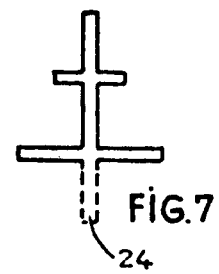
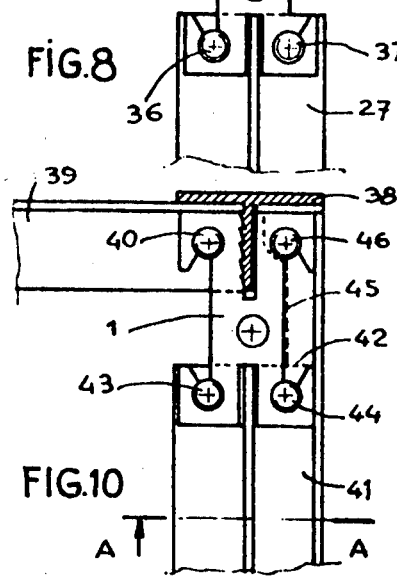
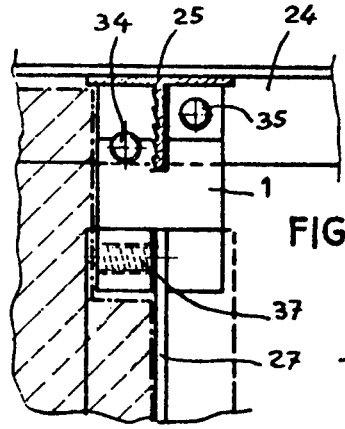
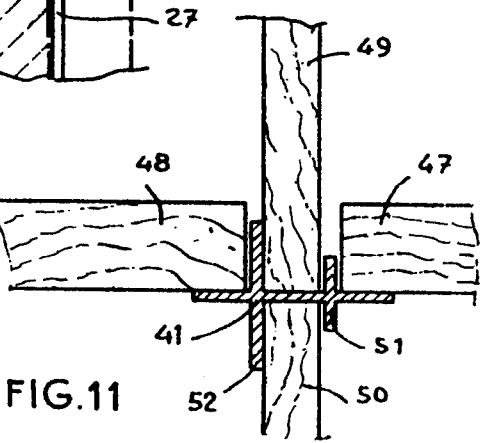

SECTION PIECE FOR T-SECTION ASSEMBLY

This is a division of application Ser. No. 365,097 filed May 30, 1973, now U.S. Pat. No. 3,920,345.

BACKGROUND OF THE INVENTION

The object of this invention is the assembly of T-section pieces intended for the construction of miscellaneous shelves.

Known devices of this kind generally employ angle-irons, perforated or non-perforated section pieces, round or square tubular, open or closed section pieces, most often requiring for their assembly several different elements depending upon the type of setup to be made.

SUMMARY OF THE INVENTION

The device according to the invention uses a single assembly element for all possible cases of mounting these T-section pieces. The assemblies therefore are extremely simple; the section piece cross-sections do not require any precision because they are invisible. The assembly element may be arranged anywhere on the section pieces.

The device which is the object of this invention involves four types of section pieces and a single assembly element. The first section piece, in the shape of a T, has larger dimensions than the others; it serves to make up the carrying framework, the three others can be used to support the levels or partitions. These section pieces, as well as the assembly pieces, may be made in various materials, such as iron, plastics, aluminum alloys. They are preferably formed by extrusion.

BRIEF DESCRIPTION OF THE DRAWINGS

Other features and advantages of this invention will emerge better from the following description, given here with respect to the attached drawings supplied by way of nonrestrictive examples and they will give us a better understanding of the implementation of the invention.

FIG. 1 shows the assembly element in the extrusion direction.

FIG. 2 is a view of this same element.

FIG. 3 is a top view of this same element.

FIG. 4 is a cross-section of the T-section piece.

FIG. 5 is a cross-section of a variant of the section piece.

FIG. 6 is a cross-section of another variant of the section piece.

FIG. 7 is a cross-section of a section piece in the form of a Cross of Lorraine.

FIG. 8 shows an example of assembling T-section pieces.

FIG. 9 represents a right-side view of the assembly shown in FIG. 8.

FIG. 10 represents the assembly of a section piece in the shape of a Cross of Lorraine.

FIG. 11 is a cross-sectional view taken along the line AA in FIG. 10, indicating the arrangement of the partitions and levels on a section piece in the form of a Cross of Lorraine.

DETAILED DESCRIPTION OF AN EXEMPLARY EMBODIMENT

As shown in FIG. 1, the assembly element for the T-section pieces or for the pieces in the form of a Cross of Lorraine involves the body 1, the slot 2 situated in the axis of the body 1, which is equipped on one of its faces with bevelled grooves 3, slot 4 having a length shorter than that of slot 2 but having the same width and corresponding to the thickness of the section piece, the four thread-cut holes 5, 6, 7, and 8, open over 1/5 of the circumference so as to simplify the threading. The dotted line 9 represents a variation in the shape of body 1. Hole 10 can be smooth or thread-screwed if it is necessary to attach a jack or a small wheel. The dotted lines 11 and 12 represent the bottom of two perpendicular slots.

The side view in FIG. 2 shows the slots 11 and 12 situated in the axis of body 1, the screw-threaded holes 15 and 16 coming out into the slot 2 of body 1. The top view in FIG. 3 shows the relative arrangement of the slots 2 and of the assembly element.

FIG. 4 shows the T-section piece 17, carrying on the blade 18 the bevelled shoulders 19. These shoulders 19 correspond exactly to the shoulders 3 of slot 2 in body 1 of FIG. 1. When the blade 18 is inserted in the slot 2, two basin screws, arranged in holes 15 and 16, keep the shoulders 3 and 19 against each other, and at the same time providing for positioning, tightening, and the antiwarping of section piece 17.

FIG. 5 shows a variation of the antiwarping shoulder 20 on T-section piece 21 where there is a single projection at the end of the blade.

FIG. 6 shows another shoulder variation on section piece 22; where the section pieces include a series of grooves 23 with perpendicular edges which, in cooperation with the corresponding grooves of a variation of body 1, not shown here, guarantee the antiwarp of the section piece 22.

FIG. 1 shows a section piece in the shape of a Cross of Lorraine. One variation of this section piece consists in eliminating part 24 of the latter's core for the extremity mountings, involving a partition.

FIG. 8 shows an example of the assembly of section pieces 24, 25, 26, and 27 on body 1 of the assembly element. Section piece 24 is engaged in grooves 3 of slot 2 and is tightened by screws 34 and 35, not visible here. The section pieces 25 and 26 are supported at 28 and 29 against the interior of the T-bar 24 and the blades 30 and 31 of the section pieces 25 and 26 are engaged in groove 12 of body 1 and are tightened by screws 32 and 33. However, the section piece 27, engaged in grooves 4 and 14 of body 1, is tightened by screws 36 and 37. With respect to the section piece 24, arranged vertically, the mounting plane of the shelves, represented by the top of the blades of the section pieces 25, 26, and 27, may be situated on any level and may be adjusted for any setup by unscrewing the screws 32 and 33 which fasten the body 1 upon the post 24.

FIG. 9 shows the mounting in FIG. 8, looking from the right side thereof. The T-section piece 27 may be arranged either as shown in FIG. 8 or in another direction, the blade of the vertical T-bar being shown in FIG. 9 by; the dotted line. One shelf, which is shaped to accommodate the assembly element 1, is shown by the dot-dash lines and cross-hatching.

FIG. 10 shows a mounting of an end with a section piece in the shape of a Cross of Lorraine according to FIG. 7 including the part 24. FIG. 10 includes the vertical section piece 38, the assembly element 1, the section piece 39 fastened by the two screws 40, opposite each other, and the section piece in the shape of a Cross of Lorraine 41 which may be interrupted along the the dots 42 and may be fastened by screws 43 and 44, or it may continue along the dotted line 45 and may also be held in place by screw 46.

FIG. 11 shows the arrangement of partitions and shelves along cross-section AA in FIG. 10 with the prolongation 24 shown in FIG. 7 of the section piece 41 which supports the shelves 47 and 48 and the partitions 49 and 50, simply placed between the blades 51 and 52 of the section piece 41.

I claim:

1. An assembly element and section piece comprising a parallelpiped with respective pairs of first, second and third endfaces, two first slots, each first slot opening lengthwise into one of the first endfaces across at least a substantial portion of one dimension thereof, a section piece including an elongated member with one side being adapted to abut said first endface, a blade portion projecting from said one side of the member, each first slot having a depth sufficient to receive and accommodate the blade portion of said section piece, one of the first slots including an inner surface shaped and adapted to form a mating portion to mate with the cooperating mating portion of the blade portion inserted therein, four first threaded openings in the parallelpiped, each first opening extending therethrough parallel to the first slots and opening into both of the second endfaces thereof each of the openings being located between one of the first slots and one of the third endfaces, two second slots extending perpendicular to and intersecting the first slots, each second slot opening lengthwise into one of the first endfaces of the parallelpiped across the entire dimension thereof and into the third endfaces a distance corresponding to its depth, the second slots having a depth sufficient to receive and accommodate additional section pieces, two second threaded openings opening into one of the third endfaces and extending through the parallelpiped and opening into the surface of the first slot opposite the surface that includes the mating portion, the second openings being located on opposite sides of the second slot which intersects the first slot that includes the surface with the mating portion.

2. The assembly element and section piece in claim 1, wherein said section piece has a "T" shaped cross-section.

3. The assembly element and section piece in claim 1, wherein said section piece is shaped like a Cross of Lorraine in cross section.

* * * * *